United States Patent Office 3,556,981
Patented Jan. 19, 1971

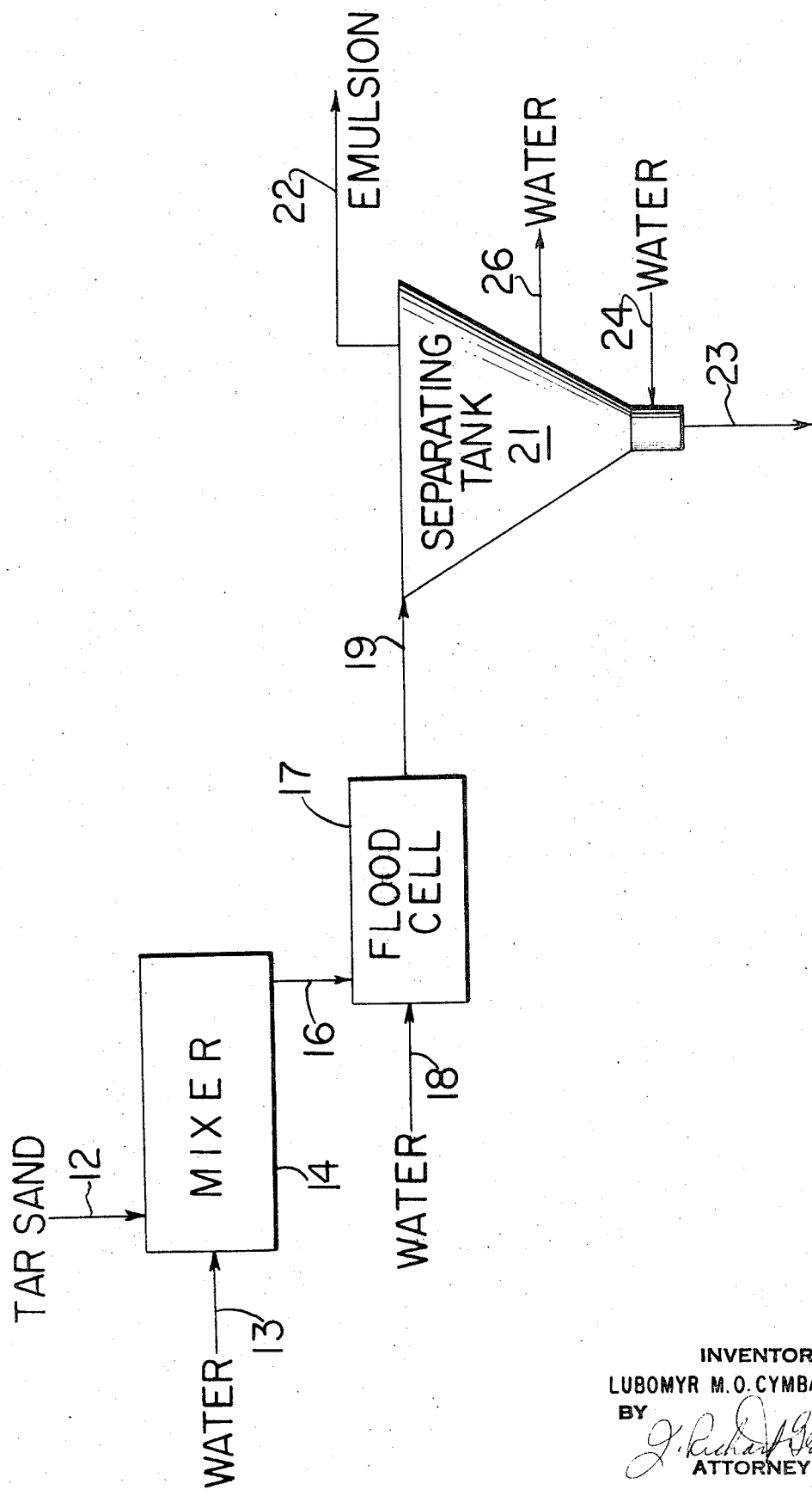

3,556,981
SEPARATION OF BITUMEN FROM BITUMINOUS SAND USING A DENSE SLURRY AND CONTROLLED VELOCITIES
Lubomyr M. O. Cymbalisty, Edmonton, Alberta, Canada, assignor of thirty percent each to Cities Service Athabasca, Inc., a corporation of Delaware, Imperial Oil Limited, a corporation of Canada, and Atlantic Richfield Corporation, a corporation of Pennsylvania, and ten percent to Royalite Oil Company, Limited, a corporation of Canada
Filed June 17, 1968, Ser. No. 737,668
Int. Cl. C10g 1/04
U.S. Cl. 208—11  2 Claims

ABSTRACT OF THE DISCLOSURE

Bitumen is recovered from bituminous sand by slurrying the bituminous sand with between about 15 and about 25 weight percent water and then introducing the slurry into a body of water so that the bitumen floats to the top and the sand settles to the bottom. Additional flooding water is added to the slurry prior to the separation step. Prior to introduction of the flooding water, linear velocity of the slurry is maintained less than 2 feet per second. Following addition of the flooding water, the linear velocity of the slurry is maintained above 2 feet per second until the slurry is introduced into the body of water for separation of bitumen therefrom.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 mircons. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines, and quantities of coarse sand. Such an emulsion or froth is referred to herein as a bituminous emulsion.

One well-known method for preparing such emulsions is often referred to as the "hot-water process." In the hot-water process, the bituminous sand is slurried with hot water and the pulp is then agitated with a stream of circulating hot water and carried to a separation cell maintained at an elevated temperature of about 180° F. In the separation cell, entrained air causes the bitumen to rise to the top of the cell in the form of an emulsion containing air, bitumen, water and mineral solids.

A bituminous emulsion, such as that obtained by the above-described procedures, often contains from about 10% to about 60% water, 15% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% of bitumen.

Separation of water and mineral solids from the bituminous emulsion is necessary for most ultimate uses of the bitumen. A number of methods have been proposed for breaking bituminous emulsions and recovering the bitumen. One such method involves the use of thermal dehydration followed by cycloning as described in U.S. Pat. No. 3,338,814 to R. A. Given et al.

It has now been found that in processes such as the hot water process described above in which aqueous slurries of bituminous sand are introduced into water for separation and recovery of bitumen therefrom improved efficiencies and improved quality of bituminous emulsion product may be obtained if the initial aqueous slurry is formed with a water content between about 15 and about 25 weight percent (wt. percent), and additional flooding water is added to bring the water content of the slurry to between about 35 and about 55 wt. percent with linear velocity of the slurry being maintained below 2 feet per second prior to addition of the flooding water and above 2 feet per second after addition of the flooding water.

The accompanying drawing is a somewhat diagrammatic illustration in which equipment is shown in elevation of a suitable arrangement of apparatus for carrying out a preferred embodiment of the invention.

Referring to the drawing, bituminous sand entering through a conduit 12 and hot water entering through a conduit 13 are mixed in a mixer 14 to form a slurry. The aqueous slurry thus formed is at a suitable temperature such as between about 105 and 180° F. and has a water content between about 15 and about 25 weight percent. From the mixer 14 the slurry may be passed through a conduit 16 to a flood cell 17 in which additional flooding water entering as through a conduit 18 is mixed with the slurry to increase the water content thereof to between about 35 and about 55 weight percent. From the flood cell 17 the flooded slurry is passed through a conduit 19 to a separating tank 21 containing a body of water into which the slurry is introduced. Bitumen rises to the top of the body of water in the separating tank 21 and may be removed from the upper portion thereof in the form of a bituminous emulsion as through a conduit 22 while sand settles to the bottom and may be removed as through a conduit 23. As is conventional in such processes, water may be introduced through a conduit 24 to wash sand prior to its removal and a side stream of water may be removed through a conduit 26 and may if desired be recycled to the mixing step or treated for recovery of bitumen or solids therefrom. The slurry in conduit 16 is maintained at a linear velocity below 2 feet per second while the slurry passing through the conduit 19 is maintained at a linear velocity in excess of 2 feet per second. The temperature of water in the separating tank 21 is preferably maintained between about 160 and about 180° F.

Prior work in recovery of bitumen from tar sands has involved the use of aqueous slurries which generally are formed using substantially greater amounts of water than called for by the present invention. Some early work was carried out using dense slurries but the advantages of controlling the velocity of the slurry prior to and subsequent to flooding, have not previously been recognized. In accordance with the present invention, high density slurry (water content between about 15 and about 25 weight percent) is maintained at velocities below 2 feet per second from the time the slurry is initially formed until such time as the slurry is flooded with additional water. The slurry is then maintained at a linear velocity in excess of 2 feet per second until entering into the separation zone. If dense slurry is transported at velocities above 2 feet per second, the slurry frequently becomes overaerated, resulting in excessive amounts of solids in recovered bitumen. If the flooded slurry is not maintained at a velocity in excess of 2 feet per second, bitumen particles agglomerate and render the separation of bitumen from solids more difficult and less effective.

Slurry formed in accordance with the invention is maintained at suitable temperature such as between about 105 and about 180° F., preferably between about 105 and about 135° F. until it is introduced into the body of water in the separation zone. At higher temperatures, the bitumen in the slurry may become softer and accept clay and other solids more readily. This results partially in excessive quantities of solids in the bituminous emulsion recovered from the separation zone. While the softening of bitumen at relatively higher temperatures makes it undesirable to maintain the slurry at such higher temperatures, it is desirable to maintain the body of water in the separation zone at higher temperatures such as between about 150 and about 200° F. in order to promote flotation of the bitumen to the surface of the water for recovery. It is preferred in operating in accordance with the present invention that the slurry temperature be maintained in the range of about 105 to about 135° F. prior to introduction into the separation zone but that the body of water in the separation zone itself be maintained between about 150 and about 200° F. to promote cleanup and flotation of bitumen. The advantages of the higher temperature for flotation are thus obtained without the disadvantages obtained when bitumen is maintained at these higher temperatures during the time required for slurry, flooding and transportation to the separation zone.

Slurry formed and transported in accordance with the present invention has been found to contain smaller air bubbles than slurry formed under conditions of higher water content or higher temperatures. This is probably due to the increased shearing effects during slurrying between layers of slurry under conditions specified for the present invention. As a result, air to bitumen attachment is improved and the oil phase in the slurry has a higher air content. It has also been found that with slurry of the present invention, there is an increased preference for disintegration of tar sand in preference to disintegration of clay. This, of course, reduces the amount of fine clay present in the system and thus the amount of fines retained in the bituminous emulsions recovered as a product of the process.

Additional advantages of forming and transporting slurry in accordance with the present invention include reduced agglomeration of bitumen particles, less phase separation within the slurry and increased retention of light hydrocarbon material in the bitumen.

EXAMPLE

For this example, tar sand containing 11.15 weight percent bitumen, 4.32 weight percent water and 84.53 weight percent solids was mixed at the rate of 60 lbs. per hour with sufficient water to form a slurry containing 18 weight percent water at a temperature of 112° F. This slurry was then passed at relatively low linear velocities, i.e. below 2 feet per second, to a flood cell where additional water was added at the rate of 45 lbs. per hour to raise the water content of the slurry to 50 weight percent without substantially changing the temperature of the slurry. The flooded slurry was then transported at a linear velocity exceeding 2 feet per second to a separation cell containing a body of hot water maintained at a temperature of 170° F. and the bituminous emulsion which floated to the top of the body of water was recovered and found to consist of 5.9 weight percent bitumen, 18.75 weight percent water and 75.29 weight percent solids. 97.6 of the bitumen present in the original tar sand feed was recovered in the bituminous emulsion. The pH of the system was 10.42. From the composition of the emulsion, it can be seen that the emulsion contained 7.9 lbs. of solids per 100 lbs. of bitumen and 24.9 lbs. of water per 100 lbs. of bitumen. Sodium hydroxide was used in the water added to the process in amounts resulting in a concentration in the flooded slurry of 0.1 weight percent sodium hydroxide based on tar sand feed to the process.

If desired, the bituminous emulsion recovered from the present process as through the conduit 22 shown in the drawing may be treated for further reduction of solids or water content by previously known means such as by washing with additional water, dilution with additional hydrocarbons followed by settling, etc.

While the invention has been described above with reference to preferred embodiments thereof, it will be understood by those skilled in the art that various changes and modifications may be made without departing from the spirit and scope of the invention and it is intended to cover all such changes and modifications in the appended claims.

I claim:

1. In a process for the recovery of bitumen from bituminous sand containing the same in which an aqueous slurry of bituminous sand is introduced into a body of water for separation of bitumen therefrom, the improvement which comprises initially forming such aqueous slurry with a water content of between about 15 and about 25 weight percent and then flooding the slurry with additional water to increase the water content thereof to between about 35 and about 55 weight percent while maintaining the linear velocity of the slurry below 2 feet per second prior to such flooding with additional water and above 2 feet per second subsequent to such flooding with additional water until the slurry is introduced into the body of water for separation of bitumen therefrom.

2. The process of claim 1 in which the temperature of the slurry is maintained between about 105 and about 135° F. prior to being flooded with additional water and in which the body of water is maintained at a temperature between about 150 and about 200° F.

References Cited

UNITED STATES PATENTS

| 3,271,293 | 9/1966 | Clark | 208—11 |
| 3,401,110 | 9/1968 | Floyd et al. | 208—11 |

FOREIGN PATENTS

| 488,928 | 12/1952 | Canada | 208—11 |
| 586,229 | 11/1959 | Canada | 208—11 |
| 741,301 | 8/1966 | Canada | 208—11 |

CURTIS R. DAVIS, Primary Examiner